United States Patent [19]

Leon, Jr. et al.

[11] Patent Number: 4,514,466

[45] Date of Patent: Apr. 30, 1985

[54] FIRE-RESISTANT PLENUM CABLE AND METHOD FOR MAKING SAME

[75] Inventors: Joseph A. Leon, Jr.; Joseph C. Caprino, both of Schenectady, N.Y.

[73] Assignee: General Electric Company, Schenectady, N.Y.

[21] Appl. No.: 385,227

[22] Filed: Jun. 4, 1982

[51] Int. Cl.$^3$ .......................... B32B 27/00; H01B 7/00

[52] U.S. Cl. .................................... 428/383; 428/384; 428/391; 428/375; 174/121 A; 174/122 G

[58] Field of Search ............... 428/383, 384, 391, 390, 428/375, 379; 174/122 G, 122 C, 121 A, 124 GC, 124 G

[56] References Cited

U.S. PATENT DOCUMENTS

| | | | |
|---|---|---|---|
| 3,425,865 | 2/1969 | Shelton, Jr. | 428/384 |
| 4,303,735 | 12/1981 | Kehrer et al. | 428/391 |
| 4,340,090 | 7/1982 | Matsushita et al. | 428/391 |
| 4,431,701 | 2/1984 | Hamada et al. | 428/391 |
| 4,431,982 | 2/1984 | Monroe et al. | 428/391 |

*Primary Examiner*—George F. Lesmes
*Assistant Examiner*—Beverly K. Johnson
*Attorney, Agent, or Firm*—Donald J. Voss

[57] ABSTRACT

A new and improved method for preparing a fire resistant electrical-conductor is disclosed in which a length of a metal core conductor is first wrapped with a mica-impregnated glass tape to form a continuous first layer, and then an outer coat of a heat-curable platinum catalyzed silicone rubber composition is applied around the tape layer which is cured to form a fire resistant insulation for the electrical conductor. The insulated conductors of the invention provide circuit integrity under fire and may be useful in critical circuitry such as fire alarms and elevators.

4 Claims, 1 Drawing Figure

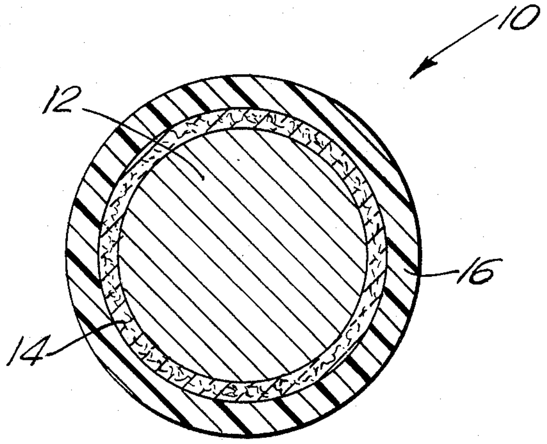
10
12
16
14

FIRE-RESISTANT PLENUM CABLE AND METHOD FOR MAKING SAME

BACKGROUND OF THE INVENTION

The present invention relates to a method for preparing a new and improved fire-resistant, insulated conductor and to new and improved insulated conductors made in accordance therewith. More particularly, it relates to a fire-resistant insulation prepared by helically wrapping a conductor with at least one layer of mica-impregnated glass tape in a half-lapped fashion to form a continuous first layer, and applying a continuous outer layer of a curable, platinum catalyzed silicone rubber composition thereto and curing said outer layer to form a hardened, fire-resistant insulation.

In recent times, the hazards associated with fire in skyscrapers and other heavily populated buildings have become more appreciated. The need to provide circuit integrity to certain critical circuits, such as fire alarms and elevators, in the event of fire cannot be overemphasized.

It has long been known to use mica in insulating compositions. Having excellent dielectric properties and fire-resistance, this natural material is well suited for use in electrical insulation applications. Typically, mica insulations are provided in the form of mica tapes, such as described in U.S. Pat. No. 2,656,290. As described therein, individual mica flakes are bonded to one another, as well as to a pliable base sheet, and, if desired, also a cover sheet, by a liquid bonding agent which may be hardened by suitable additives. The bonded mica tape used for these purposes may be relatively narrow, having a width of 2 to 3 cm for example, or it may be used in sheets of greater width. A selected conductor is wrapped with the mica tape and the wrapped conductor is subjected to a vacuum and impregnated with a thin liquid impregnating resin. The resin and the bonding agent are specifically chosen such that the bonding agent, together with the hardners and polymerization accelerators present in the impregnating resin, combine completely with the impregnating resin to form a uniform hardened insulative coating. Considerable time and effort has been spent in making mica tape insulation which is flexible and exhibits good adhesion of mica to tape. The shortcoming with such tapes is that the vacuum impregnation step tends to be costly and care must be taken that the impregnating resin is fully dispersed throughout the windings to eliminate voids in the insulation which decrease the dielectric properties of the resulting insulation. Further, these compositions generally are not fire-resistant enough at high temperatures to be suitable in today's applications.

More recently it has been known to use fluoropolymers, such as tetrafluoroethylene (TEFLON) and ethylenetetrafluoroethylene (TEFZEL) as insulative coatings. Such materials are effectively fire-resistant up to about 250° C.–300° C. which is an improvement, and have excellent dielectric strength. A serious shortcoming with these insulations however is that at high temperatures when these polymers burn, they may give off toxic gases rendering their use less than desirable in today's construction applications.

Recently, elsewhere in the polymer art, there have been developed new and improved silicone elastomers such as those described in U.S. Pat. No. 4,061,609, assigned to the same assignee as the present invention. The silicone elastomers described therein include a vinyl-containing polysiloxane, a hydrogen-containing siloxane, a platinum catalyst and further include an inhibitor compound containing at least one hydroperoxy radical added to improve processability. Similar but uninhibited silicone elastomers having a silica filler have been shown to be flame-retardant in U.S. Pat. No. 3,514,424.

It has now been found that the platinum-catalyzed silicone elastomers described in the former patent are well suited to produce new and improved fire-resistant insulations in combination with a mica-impregnated glass tape.

SUMMARY OF THE INVENTION

In accordance with the present invention, there is provided a new and improved method for preparing fire-resistant electrical insulation. According to the invention a length of electrically conductive metal core conductor is provided, such as copper wire, which is first helically wrapped in a half-lapped fashion with a mica-impregnated glass tape to form a continuous first layer. A second outer coat of a curable, platinum-catalyzed silicone rubber composition is applied around said tape layer and cured to produce a continuous, tough, fire-resistant electrical insulation system around said conductor.

The new and improved electrical insulations of the subject invention are fire-resistant and provide circuit integrity under fire at temperatures of 1000° C. or more. At these elevated temperatures the silicone rubber outer coat layer burns to a non-conductive silica ash which, in combination with the mica-impregnated glass tape, provides the electrical insulation required to maintain circuit integrity. The silicone rubber does not give off any toxic gases as it burns which is a distinct advantage over prior art fluoropolymer insulations. In addition, raw materials costs for the insulations of the present invention are greatly decreased over conventional fluoropolymer designs. Another advantage of the present insulations is that the silicone rubber coat layer may be applied through thin-wall extrusion methods thereby obviating the need for vacuum impregnation processing required in prior art insulations.

Other objects and advantages of the subject invention will become apparent from the following detailed description taken in conjunction with the following drawing in which:

FIG. 1 is a cross-sectional view of a new and improved electrically conductive cable insulated in accordance with the new and improved insulating method of the subject invention.

DETAILED DESCRIPTION OF THE INVENTION

According to the subject invention, a new and improved method for preparing a flame-resistant insulated electrical conductor comprises providing a length of electrically conductive metal core conductor; overwrapping said core with a thin continuous layer, helically half-lapped, of a mica-impregnated glass tape; applying an outer coat of a curable platinum-catalyzed, silicone rubber composition around said tape layer; and then curing said outer coat to produce a continuous, tough fire-resistant electrical insulation for said conductor.

Referring to FIG. 1, a new and improved electrically-conductive cable 10 is shown, insulated in accordance with the subject invention. As illustrated in FIG. 1, cable 10 is prepared by providing a length of an electrically-conductive metal core conductor 12. Core conductor 12 is overwrapped, in a helical half-lap fashion, with a mica-impregnated glass tape 14 forming a continuous first layer. A second outer coat of a platinum-catalyzed silicone rubber composition 16 is applied around tape layer 14 and is cured, thereby providing a tough, continuous, fire-resistant electrical insulation to core 12 of cable 10.

Although the insulating method of the subject invention is well suited for insulating wires and cables, such as those made from copper or aluminum, any electrically-conductive metal core conductor may be insulated in accordance with this invention, as for example, high voltage coils, etc.

In accordance with the subject invention the length of metal core conductor 12 is helically overwrapped in half-lap fashion with mica-impregnated glass tape 14 to form a continuous first layer. Mica-impregnated glass tape insulations are well known in the art and generally comprise a backing or base layer of glass fiber sheet or glass cloth, an evenly distributed mica flake layer and a liquid thermosetting binding resin such as an alkyd, an epoxy, or a silicone resin. Typically, the pliable glass base sheet is passed below the mica dropping tower of a conventional mica layering machine. A solution of the selected liquid resinous binder dissolved in a volatile solvent is dripped upon the mica flakes in a quantity sufficient to wet them. The wetted mica layer is rolled to spread the solution of the binder between the mica flakes and the glass layer. The composite insulation is then heated to drive off the solvent, leaving substantially only the liquid resinous binder.

In a preferred embodiment, the mica-impregnated glass tape will be a tape such as GEMAX ® tape available from the General Electric Company. GEMAX tape is a thin laminated structure of mica paper supported by glass fabric or mat or glass roving laid parallel to each other in the direction of the tape. The entire structure is then bonded together by a silicone resin or other high temperature organic/inorganic binders resulting in a fully cured laminate.

These tapes may be prepared by bonding the mica paper and its supporting structure together by a resin and then impregnating the mica paper with the desired high temperature resin. The resin is then cured to provide a smooth tack-free roll of material which can then be slit into rolls of tape of various widths.

The platinum-catalyzed silicone rubber compositions 16 for use in the subject invention are suitably described in U.S. Pat. No. 4,061,609, incorporated herein by reference. As described therein, the platinum-catalyzed silicone rubber composition comprises:

(a) 100 parts of a vinyl-containing base linear polysiloxane of the formula, $$R_a SiO_{4-a/2} \quad (1)$$

and blends of such polysiloxanes where R is selected from the class consisting of alkyl radicals of 1 to 8 carbon atoms, vinyl radicals, phenyl radicals, fluoroalkyl radicals of 3 to 10 carbon atoms and mixtures thereof wherein the vinyl radical concentration in said polymer is at least 0.005 mole percent and varies from 1.98 to 2.01;

(b) at least 0.1 parts per million of platinum;

(c) from 1 to 50 parts of a hydrogen containing polysiloxane; and (d) at least 0.007 parts of an inhibitor compound having at least one —C—O—O—H radical per 100 parts of said vinyl containing linear base polysiloxane.

Preferably, the vinyl-containing linear base polysiloxane has the formula, (2)

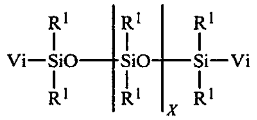

and has a viscosity that varies from 1,000 to 300,000,000, and more preferably varies from 1,000,000 to 200,000,000 centipoises at 25° C., wherein in formula (2) the Vi is vinyl and $R^1$ is selected from the class consisting of vinyl, phenyl, alkyl radicals of 1 to 8 carbon atoms, and fluoroalkyl radicals of 3 to 10 carbon atoms and mixtures thereof and where X varies from 2,500 to 11,000. There may be mixed into the base polymer also a vinyl-containing polysiloxane where the vinyl is appended to the silicon atoms in the internal part of the polysiloxane polymer chain. Such a vinyl-containing polysiloxane is preferably of low viscosity and acts both as a diluent and as a reinforcing agent for the final cure of the elastomer. It can be appreciated that the vinyl-containing base polymer may be one polymer or a blend of vinyl-containing polymers and more specifically a blend of the vinyl-containing polymer of formula (2), with other vinyl-containing polymers having vinyl units both on the terminal position of the polysiloxane chain as well as the internal positions on the polysiloxane chain.

As the hydrogen-containing polysiloxane, any anhydride cross-linking agent normally utilized in SiH-olefin platinum-catalyzed reactions to form silicone elastomers or silicone polymers may be utilized in the instant case. The preferred hydride cross-linking agents for utilization in the formation of silicone elastomers are disclosed below. For instance, there may be utilized a hydride cross-linking agent composed of,

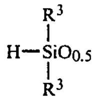

units and $SiO_2$ units where the ratio of $R^3$ to Si moieties varies from 1.1 to 1.9 and $R^3$ is selected from the class consisting generally of any monovalent hydrocarbon radicals or halogenated monovalent hydrocarbon radicals of up to 10 carbon atoms. More preferably, $R^3$ is selected from the class consisting of alkyl radicals of 1 to 8 carbon atoms, phenyl radicals and fluoroalkyl radicals of 3 to 10 carbon atoms. A specific desirable fluoroalkyl radical being trifluoropropyl. Generally, for any hydride cross-linking agent utilized in the instant invention, it is preferred that the hydride cross-linking agent have a hydride content broadly of 0.05 to 5% and more preferably of 0.1 to 1% by weight.

Another necessary ingredient in the silicone rubber compositions is a platinum catalyst. Generally, there must be utilized at least 0.1 parts per million of a platinum catalyst in terms of parts of platinum metal. This platinum catalyst may be in any form. It may be a solid platinum metal deposited on a solid carrier or it may be a solubilized platinum complex. Any type of platinum catalyst will work in the instant invention. More preferably, the platinum complex is a solubilized platinum complex. Many types of platinum compounds for this SiH-olefin addition reaction are known and such platinum catalysts may be used herein. The preferred platinum catalysts are those platinum compound catalysts which are soluble in the present reaction mixture. The platinum compound can be selected from those having the formula $(PtCl_2\text{-Olefin})_2$ and $H(PtCl_3)\text{-Olefin})$ as described in U.S. Pat. No. 3,159,601 to Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum-containing material usable in the composition of the present invention is the platinum chloride cyclopropane complex $(PtCl_2.C_3H_6)_2$ described in U.S. Pat. No. 3,159,662, Ashby.

Still further, the platinum-containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

The preferred platinum compound to be used not only as a platinum catalyst but also as a flame-retardant additive is that disclosed in Karstedt, U.S. Pat. No. 3,814,730. Generally speaking, this type of platinum complex is formed by reacting chloroplatinic acid containing 4 moles of water of hydration with tetravinylcyclotetrasiloxane in the presence of sodium bicarbonate in an ethanol solution.

The final basic ingredient in the instant composition is the inhibitor. Accordingly, in the present mixture there must be at least 0.007 parts per 100 parts of the vinyl-containing polymer of an inhibitor compound which can be any organic or silicone compound containing at least one hydroperoxy radical.

The structure of the hydroperoxy containing compound can have any desired structure as long as it contains a hydroperoxy radical in the molecular structure because it is such hydroperoxy radical that accomplishes the inhibiting activity for reasons that are not known.

Other hydroperoxy inhibitor compounds that may be utilized in the instant invention are for instance, methylethylketone peroxides, cumene hydroperoxide, 1,1,3,3-tetramethylbutylhydroperoxide, and 2,5-dimethyl-2,5-dihydroperoxy hexane.

Other compounds that may be utilized are t-butyl hydroperoxide, 1-hydroxycyclohexyl hydroperoxide, decalin hydroperoxide, p-methane hydroperoxide and a pinane hydroperoxide. These compounds are manufactured and sold by Pennwalt Corp., Hercules, Inc., and Lucidol Chemical Co. Other addition-cured and peroxide-cured silicone rubber systems may be used such as those disclosed in U.S. Pat. No. 3,445,420 and U.S. Pat. No. 3,660,345.

The above compounds are only exemplary and many other can be utilized since compounds containing hydroperoxy radicals are well known.

The other additive which may be utilized in the instant invention is a filler and accordingly per 100 parts of the basic vinyl-containing polymer there may be utilized anywhere from 5 to 50 parts of a filler selected from the class of well known reinforcing fillers, such as fumed silica and precipitated silica, and extending fillers such as, titanium oxide. For instance, there may be utilized a filler in the broad range of 10 to 75 parts which filler is selected from the class consisting of titanium oxide, lithopone, zinc oxide, zirconium silicate, silica aerogel, iron oxide, diatomaceous earth, calcium carbonate, fumed silica, cyclic polysiloxane treated silica, silazane treated silica, precipitated silica, glass fibers, magnesium oxide, chromic oxide, zirconium oxide, alpha quartz, calcined clay, asbestos, carbon, graphite, cork, cotton and synthetic fibers. The reinforcing fillers of fumed silica and precipitated silica are preferred, especially fumed and precipitated silica which have been treated with silicone compounds as is well known in the art. Also it is well known in the art that extending fillers may be used in combination with reinforcing fillers, treated or untreated, to get the proper balance in final physical properties in the silicone elastomer. Other additives may be utilized in the instant composition as is well known. For instance, there may be utilized additional flame-retardant additives; there may be utilized heat aging additives as well as pigments and process aids such as that disclosed in Konkle, U.S. Pat. No. 2,890,188. It is only necessary that the additive does not interreact with the hydroperoxy radical such that the hydroperoxy inhibitor compound loses its effectiveness.

These are the basic ingredients of the instant composition. As far as the production of the polymers within the scope of the formulas (1) and (2), these are well known compounds. Reference is made to the patent of Jeram and Striker, U.S. Pat. No. 3,884,866, whose disclosure is hereby incorporated by reference. Such polymers are usually made by the equilibration of vinyl-containing cyclic polysiloxanes or non-vinyl containing chainstoppers at elevated temperatures to produce high viscosity vinyl-containing polymers. Such equilibration reactions are carried out with the use of alkali metal catalysts or, in the case of the production of low viscosity vinyl-containing polymers, by the use of acid catalysts such as, toluene sulfonic acid or acid-activated clay. In the case when the polymer is desired to contain some fluoroalkyl groups then a slightly different procedure is utilized such as, for instance, that disclosed in the issued patent of John Razzano, U.S. Pat. No. 3,937,684. The hydride cross-linking agents are also well known as disclosed in the above Jeram and Striker U.S. Pat. No. 3,884,866. Simply stated the hydride resins are simply produced by the hydrolysis of the appropriate hydrochlorosilanes in a two-phase hydrolysis system, that is, with a water-immiscible solvent and water, and separating the resulting hydrolyzate.

In the case of fluorosilicone-containing hydride cross-linking agents, special procedures have to be utilized, for instance, those disclosed in the following Jeram patent applications: Jeram - Ser. No. 619,592, filed Oct. 6, 1975, entitled "Solvent Resistant Room Temperature Vulcanizable Silicone Rubber Compositions", whose disclosures are hereby incorporated into the present case by reference.

In accordance with the subject invention, the mica-impregnated glass tape is first wrapped in a helical half-lap fashion to form a continuous first layer around a selected electrically conductive core material. The platinum-catalyzed silicone rubber composition is then, applied around the tape layer to form a continuous outer layer which is then cured to form the tough fire-resistant insulation of the invention.

In preferred embodiments the silicone rubber composition is applied to the tape layer by thin-walled extrusion. The thin wall extrusion process is generally well known in the art. Basically, the process entails passing the extrudable material and the article to be coated through a series of machines arranged in an assembly line including, and in the following order, an extruder, a hot air vulcanizing unit (HAV), extended assembly line equipped with cool air jets and a cutter mechanism, and in this case, a winding machine for coiling the insulated wire onto spools for storage. The first step in the procedure is to introduce the silicone rubber composition into the extrusion machine. An extrusion machine generally includes a hopper section, a feed chamber equipped with a screw mechanism, a nozzle and a die. The silicone rubber composition is introduced to the hopper section of the extruding machine which is inclined so as to feed the silicone rubber material by gravity into the feed chamber. The screw mechanism rotates within the feed chamber and forces the silicone rubber towards the nozzle and the die. The nozzle contains the die and directs the silicone rubber composition thereto. The die is the opening through which the liquid material will pass. The shape of the die will determine the shape of the extrudate flowing therefrom. More particularly, the die acts as a negative template such that solid structures within the die produce hollow spaces within the extrudate.

In the case of thin-walled extrusion for coating a wrapped conductor, the die contains a central solid form with an opening as is typical in a cross-head extruder. The conductor, prewrapped with mica-impregnated glass tape is fed concentrically through an opening in the center form of the die and extends from the downstream end of the form. The silicone rubber composition is pushed through the nozzle and around the periphery of the solid die form to connect with the taped outer surface of the wrapped conductor.

The soft coated conductor is passed from the extruder machine to a HAV unit. The HAV unit is basically an elongated oven, where heating and therefore curing of the silicone rubber composition takes place. The temperatures in the HAV unit may be from 200° C. to 500° C. The silicone rubber composition should be completely cured upon leaving the HAV unit. The temperature of the HAV unit as well as the speed of the winding mechanism which draws the conductor through the assembly, and, in addition, the rate of flow of extrudate may be adjusted to insure that the outer layer of silicone rubber is continuous even, and fully cured upon leaving the unit. The cured coated conductor is then wound upon a spool for storage.

The outer coat of silicone rubber may be applied to be as thin or thick a coating as desired, according to the extrusion die used. In preferred embodiments, this layer is generally from 5 to 50 mils thick and preferably from 8 to 15 mils thick. Other methods, other than thin walled extrusion, such as dipping or spray coating may be used to apply the silicone rubber layer to the taped conductor.

The following examples are provided to better illustrate the subject invention.

EXAMPLE I

Insulated electrical conductors were made in accordance with the subject invention as follows:

A 500-foot section of #22 AWG copper wire was selected and was carefully wrapped in a helical half-lapped fashion with GEMAX® mica-impregnated glass tape along its entire length.

A TUFEL® silicone rubber composition available from the General Electric Company, was prepared and placed in the hopper section of a Davis-Standard 2 inch barrel diameter extrusion machine. The TUFEL® silicone rubber composition is a two-part system comprising the silicone rubber composition described above and in U.S. Pat. No. 4,061,609. One part of the system contains the platinum catalyst, the hydroperoxy inhibitor, the vinyl-containing base polysiloxane and fillers. The other part of the system includes the hydrogen containing polysiloxane cross-linking agent. The silicone rubber is prepared by thoroughly mixing the two parts together to form a heat curable silicone rubber composition.

The prewrapped conductor wire was loaded into the extruder machine such that it extended from a loading drum, through the extruder, extrusion die, and HAV unit, and along the assembly line to the wind spool. With the TUFEL® silicone rubber composition loaded into the hopper section, the heating chamber of the extruder was set at room temperature. The winding mechanism was set to draw the prewrapped conductor through the extruder and HAV unit at a rate of 40 ft./minute. The HAV unit was set at a temperature of about 400° C. The extruder machine and winding mechanism were started simultaneously and the silicone outer coat was applied to the wrapped conductor. The cured insulation around the conductor was approximately 10 mils thick. The insulated conductors prepared by this method provided improved fire resistance and circuit integrity under fire.

The foregoing patents are all incorporated herein by reference. Although the present invention has been described with reference to a preferred embodiment, it is apparent that modifications and changes may be made therein by those skilled in the art. All such modifications are within the full intended scope of the invention as defined by the appended claims.

What is claimed is:

1. A tough, fire resistant electrically conductive cable comprising:

(a) an electrically conductive metal core;

(b) a thin continuous tape layer of a resin impregnated mica paper laminated to a glass support selected from the group consisting of a mat, a fabric and a roving wrapped on said metal core; and (c) an outer coating of platinum catalyzed heat cured silicone rubber over said tape layer.

2. The article of claim 1 wherein the silicone rubber comprises:

(a) 100 parts by weight of a vinyl-containing base linear polysiloxane of the formula, $R_aSiO_{4-a/2}$, and blends of such polysiloxanes, where R is selected from the class consisting of alkyl radicals of 1 to 8 carbon atoms, vinyl radicals, phenyl radicals, fluoroalkyl radicals of 3 to 10 carbon atoms and mixtures thereof where the vinyl radical unsaturation in said polymer is at least 0.005 mole percent, and a varies from 1.98 to 2.01;

(b) at least 0.1 parts by weight per million of platinum;

(c) from 1 to 50 parts by weight of a hydrogen-containing polysiloxane; and (d) at least 0.007 parts by weight of an inhibitor compound having at least one radical of the formula, —C—O—O—H, per 100 parts of said vinyl-containing polymer.

3. A method for preparing a tough, fire-resistant, electrically-conductive cable, said method comprising:

(a) providing a length of an electrically conductive metal core conductor;

(b) applying to said core a thin continuous tape layer said layer comprising a resin impregnated mica paper laminated to a glass support selected from the group consisting of a mat, a fabric and a roving;

(c) applying an outer coat of a platinum catalyzed heat curable silicone rubber composition around said tape layer; and (d) curing said outer coat to produce a continuous, tough, electrically-insulating and fire-resistant conductive cable.

4. A method as recited in claim 1, wherein said curable platinum catalyzed silicone rubber comprises:

(a) 100 parts by weight of a vinyl-containing base linear polysiloxane of the formula, $R_aSi0_{4-a/2'}$ and blends of such polysiloxanes, where R is selected from the class consisting of alkyl radicals of 1 to 8 carbon atoms, vinyl radicals, phenyl radicals, fluoroalkyl radicals of 3 to 10 carbon atoms and mixtures thereof where the vinyl radical unsaturation in said polymer is at least 0.005 mole percent, and a varies from 1.98 to 2.01;

(b) At least 0.1 parts by weight per million of platinum;

(c) from 1 to 50 parts by weight of a hydrogen-containing polysiloxane; and (d) at least 0.007 parts by weight of an inhibitor compound having at least one radical of the formula, —C—O—O—H, per 100 parts of said vinyl-containing polymer.

* * * * *